United States Patent [19]

Goertz

[11] 4,025,329
[45] May 24, 1977

[54] PARTICULATE UREA-FORMALDEHYDE FERTILIZER COMPOSITION AND PROCESS

[75] Inventor: Harvey Maurice Goertz, Marysville, Ohio

[73] Assignee: O. M. Scott & Sons Company, New York, N.Y.

[22] Filed: Dec. 4, 1975

[21] Appl. No.: 637,821

[52] U.S. Cl. .......................................... 71/3; 71/28; 71/29; 71/30; 71/64 DC; 71/64 F; 71/DIG. 1
[51] Int. Cl.² ...................... C05G 3/02; C05C 9/02
[58] Field of Search ................................ 71/28–30, 71/64 B, 64 G, 64 F, 3, 34; 264/140, 321

[56] References Cited

UNITED STATES PATENTS

| | | | |
|---|---|---|---|
| 2,755,509 | 7/1956 | Smidth | 264/140 |
| 3,705,794 | 12/1972 | Czurak et al. | 71/64 D X |
| 3,794,478 | 2/1974 | Dirksen | 71/63 X |

Primary Examiner—Frank A. Spear, Jr.
Assistant Examiner—Ferris H. Lander
Attorney, Agent, or Firm—J. B. Raden; H. J. Holt

[57] ABSTRACT

A controlled-release particulate fertilizer composition is prepared by compacting and agglomerating particles of a foamed urea-formaldehyde condensation product into a sheet having a specific gravity of at least 1.40, the molar ratio of urea to formaldehyde in said condensation product being from 1.3:1 to 2.4:1, comminuting the compacted sheet into particulate form and separating and recovering the particles having a size of more than 30 mesh, substantially all said recovered particles having a ratio of largest to smallest particle of less than 3:1. The fertilizer is characterized by a high degree of uniformity from particle to particle in both composition and size, relatively high particle density and a combination of both quick initial and long lasting nutrient release.

9 Claims, 1 Drawing Figure

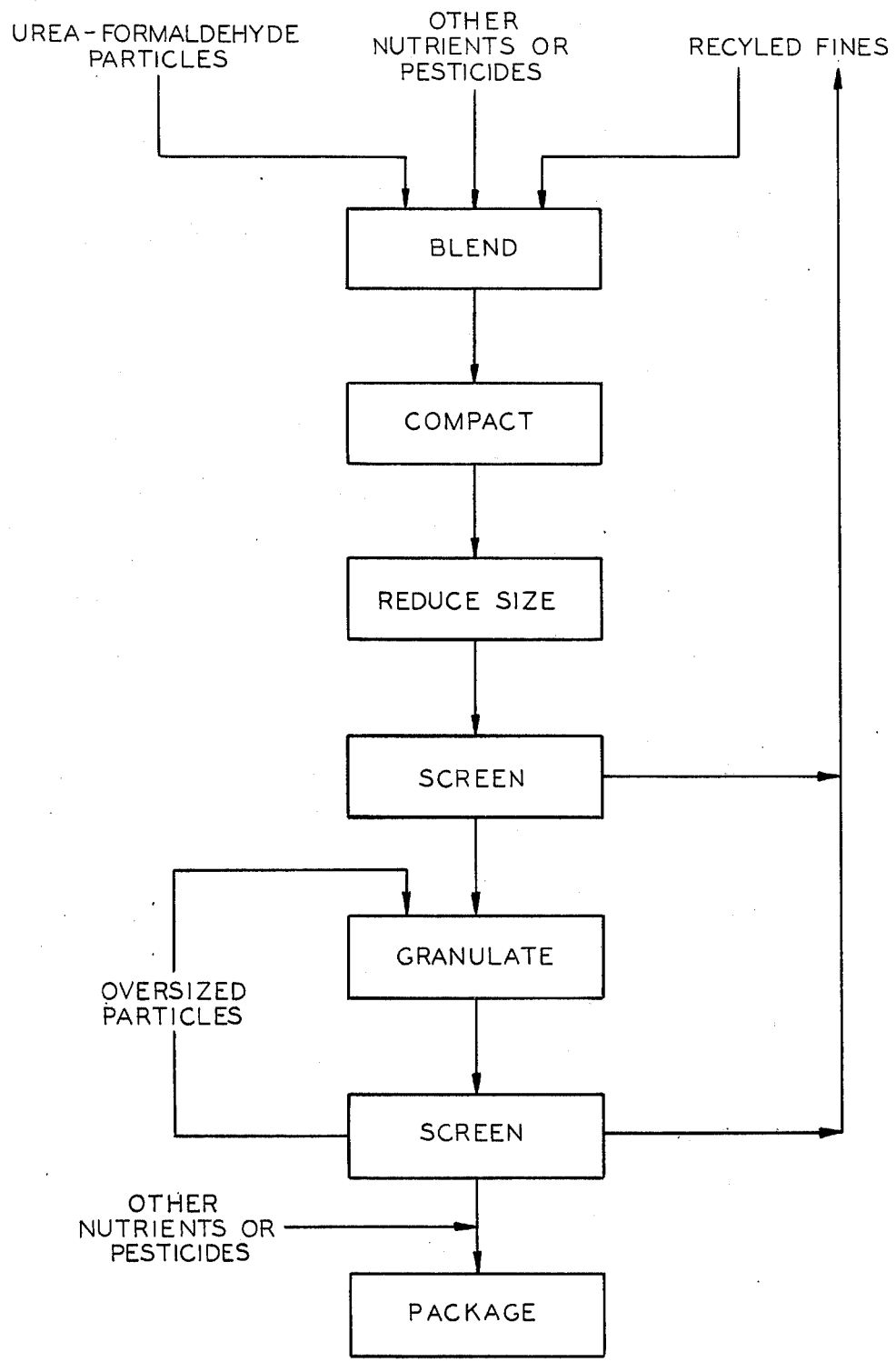

PARTICULATE UREA-FORMALDEHYDE FERTILIZER COMPOSITION AND PROCESS

This invention relates to a process for the production of a particulate urea-formaldehyde fertilizer composition and to the resulting product.

A particulate fertilizer should combine a number of important chemical and physcial properties including controlled and uniform release of nutrients to the soil, flow characteristics such that it is capable of efficient application with conventional spreaders and a high degree of particle uniformity in both size and composition. In addition, such fertilizers should be capable of being combined, uniformly and homogeneously, with other nutrient sources, pesticides or herbicides.

U.S. Pat. No. 3,705,794 to Czurak and Thompson discloses a foamed urea-formaldehyde particulate fertilizer having excellent agronomic properties, particularly nutrient release characteristics. Because the particles are dried in foamed or expanded form, a relatively high ratio of urea to formaldehyde may be used. The result is a fertilizer in which initial nitrogen release occurs relatively quickly and the release continues over a long period —from 6 to 12 weeks or longer. The foamed product does however have certain limitations. Because of reaction and drying restraints involved in its manufacture, there are limitations to the quantities of other nutrients and pesticides which can be incorporated into the foamed particles. Moreover, the product contains a significant proportion of fines and lacks the degree of size uniformity desirable for consistent delivery rates with certain commerical fertilizer spreaders. In addition, the foamed product cannot be effectively distributed with large rotary spreaders both because of presence of fines and because of its low density.

There are a number of known processes for making particulate or granular material, some of which are used in the fertilizer industry. Such processes as prilling, pellet pressing, extrusion or pan granulation are theoretically capable of producing dense particles of uniform size. Certain of these processes might eliminate one or more of the deficiencies of the foamed urea-formaldehyde products, but at the sacrifice of their excellent agronomic properties and particularly their nitrogen nutrient release characteristics. Pellet pressing and extrusion, for example, generate heat in an amount, often over 200° F, which alters the chemical properties of the low molecular weight methylene urea condensation products of the foregoing Czurak et al. patent. Prilling requires spraying in the molten state while pan granulation lacks the required process flexibility. In short, none of these processes are suitable for producing a product of the desired characteristics either because of process or product shortcomings.

It is accordingly a primary object of the present invention to provide process for producing nitrogen containing fertilizer product in particulate form which preserves the nitrogen release and other agronomic advantages of the foregoing foamed fertilizer while eliminating many of its shortcomings.

It is more specific object of this invention to provide a particulate fertilizer product which combines both early initial and long lasting nutrient release with a high degree of product uniformity and homogeneity, which may be combined homogeneously with a large number of other nutrient or pesticide additives which can be distributed at consistent delivery rates with many conventional spreaders.

The foregoing and other objects of this invention are achieved by a process involving the steps of compacting and agglomerating particles of a fomaldehyde condensation product and preferably other nutrient or pesticide additives into a sheet having a specific gravity of at least 1.40, the molar ratio of urea to formaldehyde in said condensation product being from 1.3:1 to 2.4:1, comminuting the sheet into particulate form and separating and recovering the particles having a size of more than 30 mesh, substantially all said recovered particles having a ratio of largest to smallest particle of less than 3:1. The fines of smaller than 30 mesh are continuously recycled to the process and recompacted, regranulated and resized. As used herein, the term "fines" is intended to identify particles smaller than 30 mesh. Below this size, the particles are difficult to apply with a rotary spreader and below about 70 mesh, they are essentially a dust.

The product produced by the foregoing process combines the desirable nitrogen release characteristics of the starting foamed product with the additional properties of a high degree of size and composition uniformity and relatively high particle density. Specifically, the product of the invention comprises a controlled release particulate fertilizer composition in which the particles have a specific gravity greater than 1.40, each of the particles containing a urea-formaldehyde condensation product in which the molar ratio of urea to formaldehyde is from 1.3:1 to 2.4:1, the particles being substantially uniform from particle to particle in both composition and size, the ratio of the largest to smallest of substantially all said particles being less than 3:1, said composition having substantially no particles having a size of less than 30 mesh. The compositions of the invention are characterized in that the initial release of nutrient occurs rapidly and extends for a period of at least six weeks. The initial response of a straight urea fertilizer occurs within about seven days. The initial response of the present fertilizer compositions generally occurs as quickly in point of time as straight urea, although urea's response will of course be initially greater because its rate of nutrient release is not controlled. The present fertilizers thus combine both rapid initial release with controlled long lasting release.

A particular advantage of the process of the invention is its adaptability to the inclusion of solid ingredients in addition to urea-formaldehyde. In its preferred form, the product of the invention includes at least one additional solid ingredient added prior to compaction and trapped with the urea-formaldehyde particles. The resulting combination product is substantially homogeneous chemically from particle to particle and is not subject to segregation, as would be the case in a physical mix. This provides a particularly important advantage where the added ingredient is a fast-release nitrogen nutrient such as urea. The urea, being trapped with the originally expanded urea-formaldehyde condensation product, has a lower burn factor than a simple mixture of urea and a slow release nitrogen fertilizer. The higher density of the particles also contributes to the reduction in the burn factor because the particles, being heavier, tend to fall to the ground rather than adhere to the vegetation.

In addition to urea, other plant nutrients which may be added in solid form to the foamed urea-formaldehyde condensation products prior to compaction are ammonium sulfate, lime, ammoniated phosphates such as monoammonium phosphate and diammonium phosphate, fritted trace elements and plant available iron sources such as ferrous sulfate and ferrous ammonium sulfate. Other solid ingredients which may be added before compaction are herbicides, fungicides and insecticides.

The process occurs at temperatures which are sufficiently low so as to have no chemical effect on the urea-formaldehyde foamed particles. This preserves the combined fast initial release and slow-acting nitrogen release characteristics of the urea-formaldehyde condensation product. Because any additional ingredients are trapped and compressed with the foamed particles, sticking agents or solvents may be omitted for combination products. The process is in part a sizing operation and thus particles outside a given size range are continuously separated and recycled to the operation. The result is a product of exceptional size uniformity. This provides for more consistent delivery rates with spreaders and improved safety from nitrogen burn because of the absence of fines.

The size uniformity and high density properties of the particulate fertilizer of the invention provide excellent flow properties, particularly for large scale commercial aplications to golf course fairways, sod fields, nursery crops and for aerial and forestry applications. The substantial absence of dust and fines in the products, combined with their high density, make them particularly suitable for such uses.

The invention will be better understood by reference to the accompanying drawing in which the single figure is a schematic flow diagram illustrating one embodiment of the practice of the present process.

As shown in the flow diagram, the first step of the process is a solid blending of raw materials and recycled fines generated within the process. The principal raw material is a particulate urea-formaldehyde condensation product predominately in the form of low molecular weight methylene ureas having a urea to formaldehyde ratio of 1.3:1 to 2.4:1. The product is prepared by foaming a urea-formaldehyde solution, curing and reducing the cured product to particulate form as more particularly set out in the aforesaid U.S. Pat. No. 3,705,794. As set forth in this patent, the product may also contain other nutrients or adjuvants incorporated within the foamed particles during its preparation such as potassium or phosphorous nutrient sources or pesticides.

In addition to the foamed urea-formaldehyde particles, other active constituents such as other nutrients or pesticides in solid form are also added at this initial stage of the process. The raw materials and recycled fines are fed out of surge bines through gravimetric feeders into a blender. The gravimetric feeders control the rate of each raw material entering the process. The combined raw materials and recycle material are blended together in any suitable blender. Blending may be done under ambient conditions or the blender can be fitted with a steam jacket for blending under elevated temperatures.

The blended mixture is then compacted and agglomerated into a sheet having a specific gravity of at least 1.40. This may be done by passing the blended mixture into a compacting machine consisting of two counter-rotating corrugated rolls separated by a small gap on the order of 20 to 60 thousands of an inch. As the mixture passes between the rolls, it is densified by the hydraulic pressure of the system. Typical compaction forces range from 5.0 to 12.0 tons per inch of compaction width with compaction temperatures running from room temperature to 60° C. The compacted product generally will have a specific gravity ranging from 1.4 to 1.7. The blended particles fed to the compactor are physically fused together into a sheet as the latter emerges from the compactor. In production operations, a typical compactor will produce a sheet 27 inches wide.

The compacted material is then comminuted into particulate form by first breaking the sheet to reduce the size of the long compacted sheet to small pieces or flakes which can be conveniently conveyed to subsequent stages of the process. This can be accomplished by various types of equipment, ranging from rotary cutters to saw toothed crushers. A suitable device is a commercially available rotary cutter which reduces the sheet into, for example, 1-½ × 1-½ inches pieces which may be easily conveyed. The sheet breaking operation produces a small amount of fines due to the impact of the cutter with the sheet. Consequently, the flake is passed over a scalper screen containing a coarse wire cloth. This screen separates the fines produced in the breaking operation from the quality flake. It also removes any uncompacted material which may be left in the process stream. Fines from the scalper screen are returned to the recycle surge bin for reprocessing. As used herein, the term "sheet" is intended to describe the form assumed by the compacted and agglomerated particles produced in the compaction step of the process, whereas the term "flake" is intended to describe the form of the compacted particles after the subsequent step of the process in which the sheet is reduced on size. No particular dimensions should be ascribed to the terms as used herein, other than that a flake is reduced in size from a sheet.

The flake passing over the scalping screen is then sent to the granulators for subsequent size reduction. Various types of granulators are suited for this purpose. One particularly suitable type is a cage mill consisting of counter-rotating cages with flat striker plates. The granulators are incorporated with variable speed drives so that varying degrees of size reduction can be achieved. The material emerges from the granulators in a wide range of particle sizes. The desired product size must then be separated by subsequent screening.

The size range of the final product can be selected by changing the screen cloth. A range of sizes considered useful for variouus applications are: (a) 5/16 inches + 5 mesh U.S. sieve (will pass through 5/16 inches mesh, not through 5 mesh) for aerial applications, (b) −6 + 14 mesh for rotary spreader applications and (c) −12 + 25 mesh for drop spreader applications. Oversize particles, i.e., those larger than the maximum product size, separated during the screening operation, are recycled to the granulators for subsequent size reduction. Fines, generally those less than 30 mesh, separated during the screening operation are returned to the recycle surge bin along with dust picked up at other stages of the system. All recycled fines and dust are then reprocessed through the compaction phase. The size of particles which are recycled will be determined of course by the smallest and largest size desired in a particular final product. The maximum and minimum size for a given product may therefore be larger than 30 mesh or smaller than 5/16 inches mesh. For example, in a 6 to 14 mesh product, all particles smaller than 14 mesh and larger than 6 mesh would be recycled.

It is possible to blend the thus granulated and sized particles with additional nutrients, pesticides or other additives at the conclusion of the screening operation. This can be done in various types of commercially available blenders. The product is then packaged and ready for shipment.

The following examples are specific illustrations of the practice of the invention in accordance with the foregoing process. N-P-K analyses as set forth in the following examples are based on relative weights of N, $P_2O_5$ and $K_2O$ respectively. Unless otherwise indicated, all parts are by weight.

EXAMPLE 1

A foamed urea-formaldehyde fertilizer, prepared as set forth in U.S. Pat. No. 3,705,794 and containing potassium nutrient was used having the following characteristics:

| | |
|---|---|
| Bulk Density | 32 lb/ft$^3$ |
| Particle Size | −8 + 70 |
| N-P-K Analysis | 29.6−O−14.4 |
| UF Ratio | 2.0 |

The urea-formaldehyde material was fed at the rate of 10 lbs/ minute to the compactor and was compacted, granulated and sized in accordance with the following conditions:

| | |
|---|---|
| Compaction Temperature | Ambient |
| Compaction Force | 10.93 tons/inch |
| Granulator (rpm) | 175 |

The product characteristics and properties of the final composition were as follows:

| | |
|---|---|
| N-P-K Analysis | 29.6−O−14.4 |
| Particle Size | −6 + 14 mesh |
| Maximum | 1.5% − 20 mesh |
| Size Ratio | 2.38 |
| Bulk Density | 45.1 lbs/ft$^3$ |
| Particle Specific Gravity | 1.55 |
| Release Duration | 8 to 12 weeks |
| Spreadability (Commercial Rotary Spreader-Lely) | 36 feet |

The composition of Example I was then field tested on Windsor Kentucky bluegrass and its agronomic response at various time intervals was compared with that of the original foamed urea-formaldehyde product and with a third control plot which was untreated. The compositions of the invention and the foamed urea-formaldehyde product were distributed at the rate of 0.9 lbs. of nitrogen per 1000 sq. ft. of turf. The results were as follows:

| | Color* | | |
|---|---|---|---|
| No. Of Days Following Treatment | Example I | Foamed UF | Untreated |
| 7 | 4.0 | 4.7 | 1.0 |
| 20 | 5.0 | 4.7 | 1.0 |
| 57 | 8.3 | 8.0 | 5.0 |
| 83 | 7.3 | 7.3 | 5.3 |

*Color ratings from 1 to 10, 10 best, 1 worst. Differences of less than one increment are not significant.

These results indicate that the agronomic response of the present fertilizers is essentially unchanged from the original urea-formaldehyde foamed product. At the same time, however, the spreadability of the foamed fertilizer was from 20 to 24 feet on the same commercial spreader and the ratio of largest to smallest particle was 11.3. Thus, the agronomic or release characteristics were essentially preserved while particle size uniformity, specific gravity and spreadability were considerably increased.

EXAMPLE II

A fertilizer was prepared from foamed urea-formaldehyde particles and prilled urea. The ingredients and their feed rate into the blender were as follows:

| Ingredient | | Feed Rate lbs/min. |
|---|---|---|
| UF | | 10.00 |
| Bulk Density | 32 lb/ft$^3$ | |
| Particle Size | −8 + 70 | |
| N-P-K | 26.7−6.3−12.9 | |
| UF Ratio | 2.0 | |
| Prilled Urea | | 6.81 |

The UF material was physically blended with prilled urea in a Patterson-Kelly Zig Zap blender and then compacted, granulated and screened according to the following conditions:

| | |
|---|---|
| Compaction Temp. | 120° F |
| Compaction Force | 10.93 ton/inch |
| Granulator (rpm) | 175 |

Product Characteristics:

| | |
|---|---|
| N-P-K | 34.5−3.7−7.7 |
| Particle Size | −6 + 14 |
| Maximum | 1.5% − 20 mesh |
| Size Ratio | 2.38 |
| Bulk Density | 44.3 lb/ft$^3$ |
| Particle Specific Gravity | 1.44 |
| Release Characteristic | 8 to 12 weeks |
| Spreadability (Commercial Rotary Spreader) | 40 feet |

Example II was then field tested in the same manner as the composition of Example I with the following results. The foamed UF contained a physical mixture of the same amount of ureas as that contained in Example II.

| | Color | | |
|---|---|---|---|
| Number of Days Following Treatment | Example II | Foamed UF | Untreated |
| 7 | 7.7 | 7.7 | 1.0 |
| 20 | 8.0 | 7.7 | 1.0 |
| 57 | 8.3 | 8.3 | 5.0 |
| 83 | 8.0 | 7.3 | 4.7 |

Again, agronomic response was preserved in the composition of Example II while particle uniformity and spreadability were considerably enhanced.

EXAMPLE III

A fertilizer was prepared from a foamed urea-formaldehyde product having the following characteristics:

| | |
|---|---|
| Bulk Density | 32 lb/ft$^3$ |
| Particle Size | −8 + 70 |
| N-P-K | 27.6−4.5−13.3 |
| UF Ratio | 2.0 |

The UF fertilizer was blended with prilled urea, the UF at the rate of 10 lbs/minute, the urea at the rate of 2.57 lbs/minute and compacted, granulated and sized in accordance with the following conditions:

| | |
|---|---|
| Compaction Temp. | Ambient |
| Compaction Force | 10.93 ton/inch |
| Granulator (rpm) | 175 |

Product Characteristics:

| | |
|---|---|
| N-P-K | 31.3−3.6−10.7 |
| Particle Size | −6 + 14 |
| Maximum | 1.5% − 20 mesh |
| Size Ratio | 2.38 |
| Bulk Density | 45 lb/ft$^3$ |
| Particle Specific Gravity | 1.52 |
| Release Characteristic | 8 to 12 weeks |
| Spreadability (Commercial Rotary Spreader) | 40 feet |

EXAMPLE IV

A fertilizer was prepared from a foamed urea-formaldehyde product having the following characteristics:

| | |
|---|---|
| Bulk Density | 32 lb/ft$^3$ |
| Particle Size | −8 + 70 |
| N-P-K | 33.5−5.5−4.4 |
| UF Ratio | 1.85 |

The UF fertilizer was fed to the compactor at the rate of 10 lbs/min. and compacted, granulated and screened according to the condition below without prior blending with any other components.

| | |
|---|---|
| Compaction Temp. | Ambient |
| Compaction Force | 10.93 ton/inch |
| Granulator (rpm) | 175 |

Product Characteristics:

| | |
|---|---|
| N-P-K | 33.5−5.5−4.4 |
| Particle Size | −6 + 14 |
| Maximum | 1.5% − 20 mesh |
| Size Ratio | 2.38 |
| Bulk Density | 42.4 lb/ft$^3$ |
| Particle Specific Gravity | 1.48 |
| Release Characteristic | 12 weeks |
| Spreadability (Commercial Rotary Spreader | 38 feet |

EXAMPLE V

A fertilizer was prepared from the following ingredients:

| Ingredient | | Rate (lb/min) |
|---|---|---|
| UF | | 10.00 |
| Bulk Density | 32.0 lb/ft$^3$ | |
| Particle Size | −8 + 70 | |
| N-P-K | 28.5−0−14.2 | |
| UF Ratio | 2.0 | |
| Other Ingredient | | |
| Monammonium phosphate (13-52-0) granulated | | 10.96 |

The UF material was physically blended with the granulated monammonium phosphate. The blended mixture was then compacted, granulated and screened according to the condition below.

| | |
|---|---|
| Compaction Temp. | Ambient |
| Compaction Force | 8.33 tons/inch |
| Granulator (rpm) | 175 |

Product Characteristics:

| | |
|---|---|
| N-P-K | 20.39−27.19−6.77 |
| Particle Size | −6 + 14 |
| Maximum | 1.5% − 20 mesh |
| Size Ratio | 2.38 |
| Bulk Density | 47.0 lb/ft$^3$ |
| Particle Specific Gravity | 1.61 |
| Release characteristic | 6 − 8 weeks |
| Spreadability (Commercial Rotary Spreader) | 40 feet |

EXAMPLE VI

A fertilizer was prepared from the following ingredients:

| Ingredient | | Rate (lb/min) |
|---|---|---|
| UF | | 10.00 |
| Bulk Density | 30 lb/ft$^3$ | |
| Particle Size | −8 + 70 | |
| N-P-K | 39-0-0 | |
| UF Ratio | 2.0 | |
| Other Ingredients | | |
| Ferrous Sulphate (30% Fe) | | 0.66 |
| Manganese Sulphate (28% Mn) | | 1.45 |
| Calcined Kieserite (19.39% Mg) | | 0.51 |
| Fritted Trace Elements | | 0.10 |

Ferrous Sulphate, Manganese Sulphate, Kieserite, and trace elements were preblended. The permix was then blended with the UF material. The mixture was then compacted, granulated and screened according to the conditions below.

| | |
|---|---|
| Compaction Temp. | Ambient |
| Compaction Force | 7.22 ton/inch |
| Granulator (rpm) | 260 |

Product Characteristics:

| | |
|---|---|
| N-P-K | 30.66−0−0 |
| Fe | 1.67% |

| | |
|---|---|
| Mg | 0.78% |
| Cu | 0.052% |
| Mo | 0.00052% |
| Mn | 3.18% |
| Zn | 0.052% |
| B | 0.028% |
| Particle Size | −6 + 14 |
| Maximum | 1.5% − 20 mesh |
| Size Ratio | 2.38 |
| Bulk Density | 41.8 lb/ft³ |
| Particle Specific Gravity | 1.52 |
| Release Characteristic | 6–8 weeks |
| Spreadability (Commercial Rotary Spreader) | 36 feet |

EXAMPLE VII

A fertilizer was prepared from the following ingredients:

| Ingredients | | Rate (lb/min) |
|---|---|---|
| UF | | 10.00 |
| Bulk Density | 32 lb/ft³ | |
| Particle Size | −8 + 70 | |
| N-P-K | 31.4–6.5–6.5 | |
| UF Ratio | 2.0 | |
| Other Ingredients | | |
| Urea (Prilled) | 46 − 0 − 0 | 2.93 |
| Pentachloronitrobenzene | (−70 mesh) | 5.03 |

The UF material, prilled urea and PCNB, a fungicide, were blended. The blend was then compacted, granulated and screened according to the conditions below.

| | |
|---|---|
| Compaction Temp. | Ambient |
| Compaction Force | 6.67 tons/inch |
| Granulator (rpm) | 175 |

Product Characteristics:

| | |
|---|---|
| N-P-K | 25.0–3.5–3.5 |
| Particle Size | −6 + 14 |
| Maximum | 1.5% − 20 mesh |
| Size Ratio | 2.38 |
| Bulk Density | 46.4 lb/ft³ |
| Particle Specific Gravity | 1.53 |
| Release Characteristic | 8 weeks |
| Spreadability (Commercial Rotary Spreader) | 40 feet |

EXAMPLE VIII

A fertilizer was prepared from the following ingredients:

| Ingredients | | Rate (lb/min) |
|---|---|---|
| UF | | 10.00 |
| Bulk Density | 32 lb/ft³ | |
| Particle Size | −8 + 70 | |
| N-P-K | 31.4–6.5–6.5 | |
| UF Ratio | 2.0 | |
| Other Ingredients | | |
| Urea (Prilled 46 − 0 − 0) | | 1.98 |
| Ferrous Ammonium Sulphate (Granular) 7% N 13% Fe | | 6.04 |

UF material, prilled urea and granular ferrous ammonium sulphate were blended. The blend was then compacted, granulated and screened according to the conditions below:

| | |
|---|---|
| Compaction Temp. | Ambient |
| Compaction Force | 6.94 ton/inch |
| Granulator (rpm) | 260 |

Product Characteristics:

| | |
|---|---|
| N-P-K | 24.83–3.61–3.61 |
| Fe | 4.36% |
| Particle Size | −12 + 25 mesh |
| Maximum | 1.0% − 30 mesh |
| Size Ratio | 2.36 |
| Bulk Density | 44.1 lb/ft³ |
| Particle Specific Gravity | 1.53 |
| Release Characteristic | 8 weeks |
| Spreadability (Commercial Rotary Spreader) | 24 feet |

EXAMPLE IX

A fertilizer was prepared from the following ingredients:

| Ingredients | | Rate (lb/min) |
|---|---|---|
| UF | | 10.00 |
| Bulk Density | 32 lb/ft³ | |
| Particle Size | −8 + 70 | |
| N-P-K | 29.6–0–14.4 | |
| UF Ratio | 2.0 | |
| Other Ingredients | | |
| Bensulide (96%) | | 0.93 |
| HiSil | | 0.40 |

UF material was compacted, granulated, screened according to conditions below without any other components. Liquid Bensulide, a herbicide, was then sprayed onto the surface of the compacted product in a P-K Zig-Zag blender. HiSil (an absorbent and flow aid) was also added to eliminate product wetness.

| | |
|---|---|
| Compaction Temp. | Ambient |
| Compaction Force | 7.22 tons/inch |
| Granulator (rpm) | 260 |

Product Characteristics:

| | |
|---|---|
| N-P-K | 26.13–0–12.71 |
| Bensulide | 7.88% |
| Particle Size | −12 + 25 |
| Maximum | 1.0% − 30 mesh |
| Size Ratio | 2.36 |
| Bulk Density | 45.3 lb/ft³ |
| Particle Specific Gravity | 1.59 |
| Release Characteristic | 6–8 weeks |
| Spreadability (Commercial Rotary Spreaders) | 24 feet |

EXAMPLE X

A fertilizer was prepared from the following ingredients:

| Ingredients | | Rate (lb/min) |
|---|---|---|
| UF | | 10.00 |
| Bulk Density | 32 lb/ft³ | |
| Particle Size | −8 + 70 | |

-continued

| Ingredients | Rate (lb/min) |
|---|---|
| N-P-K | 30.0-0-13.6 |
| UF Ratio | 1.5 |
| Other Ingredients | |
| Monammonium Phosphate (13-52-0) | 2.56 |

UF material and granular monammonium phosphate were blended. The blend was then compacted, granulated and screened according to the conditions below.

| | |
|---|---|
| Compaction Temp. | Ambient |
| Compaction Force | 7.78 ton/inch |
| Granulator (rpm) | 175 |

Product Characteristics:

| | |
|---|---|
| N-P-K | 26.53 – 10.61 – 10.61 |
| Particle Size | −6 + 14 |
| Maximum | 1.5% – 20 mesh |
| Size Ratio | 2.38 |
| Bulk Density | 47.0 lb/ft³ |
| Particle Specific Gravity | 1.61 |
| Release Characteristic | 10–12 weeks |
| Spreadability (Commercial Rotary Spreader) | 40 feet |

EXAMPLE XI

A fertilizer was prepared from the following ingredients:

| Ingredients | Rate (lb/min) |
|---|---|
| UF | 10.00 |
| Bulk Density | 32.0 lb/ft³ |
| Particle Size | −8 + 70 |
| N-P-K | 33.2-0-9.6 |
| UF Ratio | 2.0 |
| Other Ingredients | |
| Polyvis OSH | 0.18 |
| Benomyl (50%) | 0.48 |

UF material was compacted, granulated, and screened according to the conditions below. Benomyl (50%) a fungicide, was then adhered to the outside of the compacted UF with Polyvis OSH (a polybutene) in a P-K Zig-Zag blender.

| | |
|---|---|
| Compaction Temp. | Ambient |
| Compaction Force | 7.22 tons/inch |
| Granulator (rpm) | 260 |

Product Characteristics:

| | |
|---|---|
| N-P-K | 31.2-0-9.0 |
| Benomyl | 2.24% |
| Particle Size | −12 + 25 |
| Maximum | 1.0% – 30 mesh |
| Size Ratio | 2.36 |
| Bulk Density | 45.3 lb/ft³ |
| Particle Specific Gravity | 1.59 |
| Release Characteristic | 6–8 weeks |
| Spreadability (Commercial Rotary Spreader) | 24 feet |

EXAMPLE XII

A fertilizer was prepared from the following ingredients:

| Ingredients | Rate (lb/min) |
|---|---|
| UF | 10.00 |
| Bulk Density | 32.1 lb/ft³ |
| Particle Size | −8 + 70 |
| N-P-K | 31.4-6.5-6.5 |
| UF Ratio | 2.0 |
| Other Ingredients | |
| Dursban F (94%) | 0.10 |
| Polyvis OSH | 0.21 |
| Urea (Prilled) 46-0-0 | 1.71 |

UF material and prilled urea were blended. The mix was compacted, granulated and screened according to the conditions below. The compacted product was then coated with solution of Dursban F, an insecticide, in Polyvis OSH, a polybutene solvent, in a blender.

| | |
|---|---|
| Compaction Temp. | Ambient |
| Compaction Force | 6.94 tons/inch |
| Granulator (rpm) | 260 |

Product Characteristics:

| | |
|---|---|
| N-P-K | 32.6–5.4–5.4 |
| Dursban | 0.8% |
| Particle Size | −12 + 25 |
| Maximum | 1.0% – 30 mesh |
| Size Ratio | 2.36 |
| Bulk Density | 42.4 lb/ft³ |
| Particle Specific Gravity | 1.46 |
| Release Characteristic | 6–8 weeks |
| Spreadability (Commercial Rotary Spreader) | 24 feet |

EXAMPLE XIII

A fertilizer was prepared from the following ingredients:

| Ingredients | Rate (lb/min) |
|---|---|
| UF | 10.00 |
| Bulk Density | 32.0 |
| Particle Size | −8 + 70 |
| N-P-K | 34.1-5.4-4.0 |
| UF Ratio | 2.0 |

UF material was compacted, granulated and screened according to the conditions below.

| | |
|---|---|
| Compaction Temp. | Ambient |
| Compaction Force | 7.22 tons/inch |
| Granulator (rpm) | 130 |

Product Characteristics:

| | |
|---|---|
| N-P-K | 34.1-5.4 -4.0 |
| Particle Size | −5/16″ + 5 |
| Maximum | 1.0% – 5 mesh |
| Size Ratio | 2.01 |
| Bulk Density | 42.0 lb/ft³ |
| Particle Specific Gravity | 1.48 |
| Release Characteristic | 6–8 weeks |
| Spreadability | 120 feet applied aerially |

While the invention has been illustrated with specific examples of nutrients, micronutrients and specific herbicides, fungicides and insecticides which may be combined with the urea-formaldehyde products of the invention, many others may be used. Examples of such other additives are set forth in the aforesaid U.S. Pat. No. 3,705,794 as well as U.S. Pat. No. 3,231,363, both assigned to the present assignee. Other pesticides which may be used are shown in the Pesticide Manual, 3rd Edition, British Crop Protection Council, 1972. Other herbicides which may be used are shown in Weed Control, 2nd Edition, Robbins et al., McGraw-Hill Book Comapny, Inc., New York, New York. Other fertilizer nutrients which may be used in combination are shown in Commercial Fertilizers, 5th Edition, Collings, McGraw-Hill Book Inc., New York, New York.

I claim:

1. A controlled release particulate fertilizer composition,
    said composition comprising particles having a specific gravity greater than 1.40,
    each of said particles containing a urea-formaldehyde condensation product as a nitrogen nutrient source in which the molar ratio of urea to formaldehyde in the condensation product is from 1.3:1 to 2.4:1, and at least one additional solid plant nutrient or pesticide trapped with each of said urea-formaldehyde particles,
    said particles being substantially uniform from particle to particle in both composition and size, the ratio of the largest to smallest of substantially all said particles being less than 3:1, and substantially no particles having a size of smaller than 30 mesh,
    said composition characterized in that the initial release
    of nutrient occurs quickly and extends for a period of at least six weeks.

2. The composition of claim 1 in which the additional solid material is a plant nutrient.

3. The composition of claim 2 in which the plant nutrient is urea.

4. The composition of claim 2 in which the plant nutrient is a plant available iron source.

5. The composition of claim 2 in which the plant nutrient is an ammoniated phosphate.

6. The composition of claim 1 which the additional solid material is a fungicide.

7. The composition of claim 1 in which the additional solid material is a herbicide.

8. The composition of claim 1 in which the ratio of urea to formaldehyde in the condensation product is from 1.5:1 to 2.1:1.

9. The composition of claim 1 in which substantially all said particles have a size ranging from 30 to 5/16 inch mesh.

* * * * *